United States Patent [19]
Rees

[11] 3,729,103
[45] Apr. 24, 1973

[54] TRANSPORTER FOR MOLDED PARTS AND THE LIKE

[75] Inventor: Herbert Rees, Toronto, Ontario, Canada

[73] Assignee: Husky Manufacturing & Tool Works Ltd., Botton, Ontario, Canada

[22] Filed: Feb. 16, 1971

[21] Appl. No.: 115,373

[52] U.S. Cl. .............................214/1 BC, 214/1 BD
[51] Int. Cl. .................................................B66c 1/30
[58] Field of Search .................214/1 BC, 1 BD, 1 B, 214/1 BH, 1 BV

[56] References Cited

UNITED STATES PATENTS

| | | | |
|---|---|---|---|
| 1,958,846 | 5/1934 | Christensen | 214/1 BC X |
| 2,259,728 | 10/1941 | Bridges | 214/1 BC X |
| 2,887,767 | 5/1959 | Mott | 214/1 BC X |
| 2,049,850 | 8/1936 | Lytle | 214/1 BT |
| 1,435,334 | 11/1922 | Rickard | 214/1 BV |
| 3,149,714 | 9/1964 | Williams | 214/1 BC |

*Primary Examiner*—Gerald M. Forlenza
*Assistant Examiner*—George F. Abraham
*Attorney*—Karl F. Ross

[57] ABSTRACT

A take-off plate insertable from above between the relatively movable mold portions of an injection-molding machine co-operates with a transfer plate cantilevered on a transverse shaft at the top of a column rotatable through 180°. The shaft carrying the transfer plate is coupled by a step-down bevel-gear transmission with a fixed tube surrounding the rotatable column so that this plate turns through 90° during each 180° swing. In its vertical position, the transfer plate confronts the elevated take-off plate and removes from it the newly formed article or articles extracted from the mold; these articles are held by grippers which are deactivated in a horizontal position of the swung-out transfer plate to release the articles into an underlying receptacle therefor.

11 Claims, 7 Drawing Figures

Patented April 24, 1973

INVENTOR:
HERBERT REES
BY
Karl J. Ross
ATTORNEY

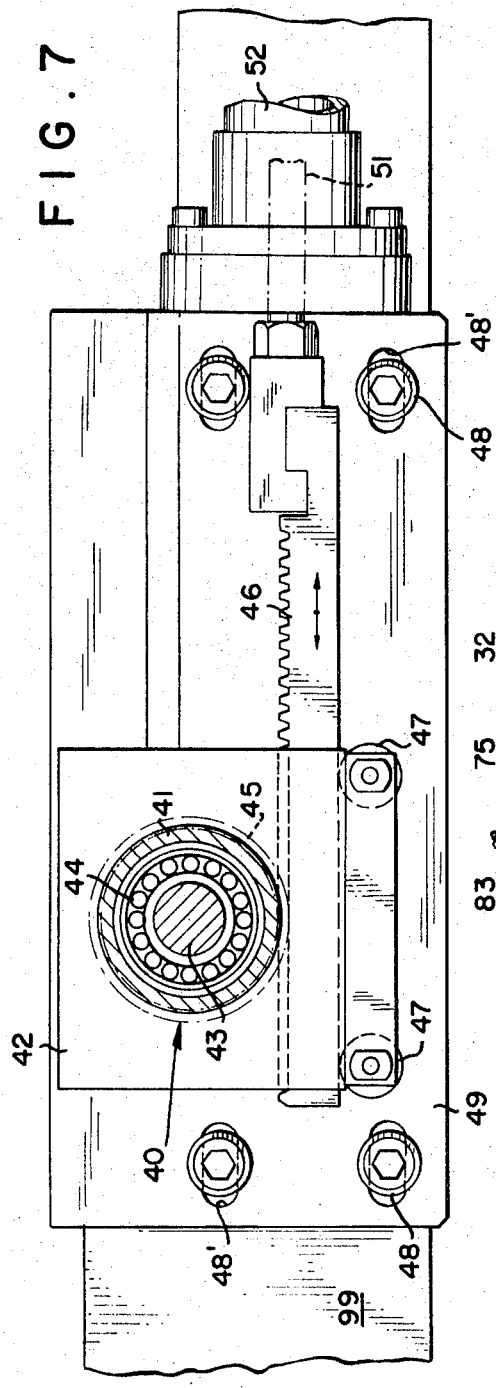
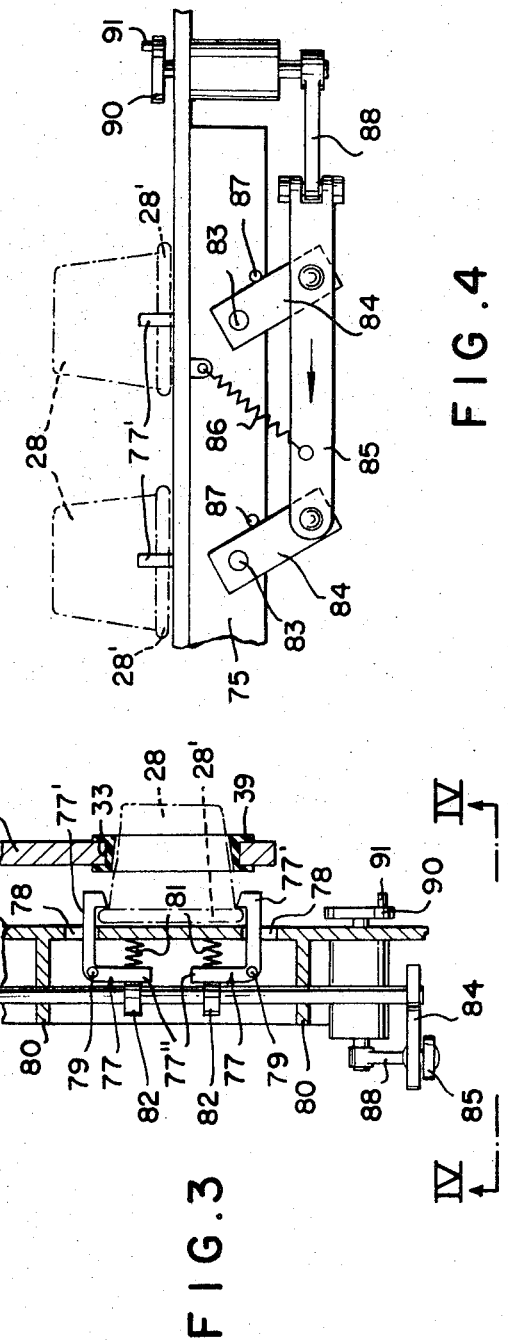
HERBERT REES
INVENTOR.
BY Karl J. Ross
ATTORNEY

HERBERT REES
INVENTOR.

BY Karl J. Ross

ATTORNEY

Patented April 24, 1973

HERBERT REES
INVENTOR.

BY Karl J. Ross

ATTORNEY

TRANSPORTER FOR MOLDED PARTS AND THE LIKE

My present invention relates to a transporter designed to remove one or more articles from a support and to deposit them on a receiving surface. More specifically, it pertains to a device for unloading a take-up member serving to extract molded articles from an injection-molding machine, e.g., as disclosed in my prior U.S. Pat. No. 3,454,991.

In a system as described in that prior patent, a take-off plate carried on the movable mold portion is provided with means for lowering it into the space between the two mold portions when the mold opens, this plate being then lifted out of that space into an elevated position in which a take-off member can pick up the molded parts and deliver them to a stacking tube or some other receptacle during the next molding cycle.

The mechanism controlling the transfer plate of may prior patent is carried, like the elevatable support for the take-off plate, on the movable mold portion in order to partake of its reciprocating motion. Such a mobile transfer assembly is, however, limited in its adaptability to different conditions of use and must be specifically designed to fit the type of machine on which it is to be installed.

An important object of my present invention, therefore, is to provide a transporter of this type which can be built and installed separately from a molding machine or other equipment with which it is to be utilized.

Another object is to provide a transporter of the character referred to whose transfer member is a plate arranged to change not only its position but also its attitude in the removal of articles from a support, specifically to turn from a substantially vertical into a substantially horizontal attitude on swinging away from the support and to reverse this motion during the subsequent return swing. Such a transfer plate can thus confront an upright take-off plate in a first position and can then come to rest horizontally, in a second position remote from the take-off plate, above a receiving surface onto which the entrained articles are to be dropped.

A transporter according to my invention comprises an upright column which is rotatable though a predetermined horizontal angle, preferably of 180°, between its two limiting positions and which carries a transverse shaft extending generally horizontally therefrom; an advantageously plate-shaped transfer member on that shaft is swingable through a predetermined vertical angle, preferably of 90°, between two distinct attitudes which in the preferred instance are vertical and horizontal, respectively, and will be so designated hereinafter. A drive mechanism, coupled with that for the movable mold portion if the transporter is associated with an injection-molding machine, reciprocates the column between its two limiting positions with substantially concurrent swing of the transfer member between its vertical and horizontal attitudes, this transfer member assuming its vertical attitude in a position confronting a take-off plate or other temporary support for the article to be removed; in its alternate position, the horizontal transfer member releases the entrained article or articles by deactivating a retaining device carried thereon.

The driving mechanism for the co-ordinated rotation of the column and of its transverse shaft advantageously comprises a pair of meshing gears on that shaft and on a fixed post rising adjacent the column, this post being preferably designed as a tube encasing the column. The tooth ratio of the fixed gear on the post and the rotatable gear on the shaft may slightly exceed the ratio of the horizontal angle of rotation and the vertical swing angle so that the shaft is driven through more than the latter angle during each rotary stroke of the column, the excess rotation of the shaft being taken up by a lost-motion coupling between that shaft and the transfer member. This lost-motion coupling insures that the transfer member remains vertical during an initial phase and stays horizontal during a terminal phase of its outward swing, thereby facilitating the pick-up of articles from the take-off plate and the dropping of these articles into an underlying open-topped receptacle. If the lost-motion coupling is partly elastic, it will also cushion the shock of arresting the transfer plate in its horizontal and vertical attitudes.

In principle, a variety of releasable retaining means may be used on the transfer member to pick up the articles from the take-off plate or other support and to deposit them on their receiving surface, e.g., under pneumatic or electromagnetic control. In a simple and therefore preferred system, however, the retaining means has the form of one or more pairs of relatively movable, resiliently biased gripper elements or latches which are mechanically deactivated by a linkage engaging an abutment on a fixed post in the swung-out position of the transverse shaft. While the transfer plate could have throughgoing holes for picking up the articles on one side and dropping them at the other side, I find it more convenient to design the gripper elements in a way enabling the articles to be seized and released on the same side of the plate, i.e., at a surface which lies next to the take-off plate in the pick-up position and forms the underside of that plate in the discharge position.

The above and other features of my invention will be described hereinafter with reference to the accompanying drawing in which:

FIG. 1 is a partial side-elevational view of a molding machine, of the general type disclosed in my aforementioned prior U.S. Pat. No. 3,454,991, equipped with a transporter according to the present invention;

FIG. 3 is an enlarged sectional detail view of part of a take-off plate and a confronting transfer plate included in the system of FIGS. 1 and 2;

FIG. 4 is a bottom view taken on the line IV—IV of FIG. 3;

FIG. 7 is a cross-sectional view taken on the line VII—VII of FIG. 5.

Figure 1:
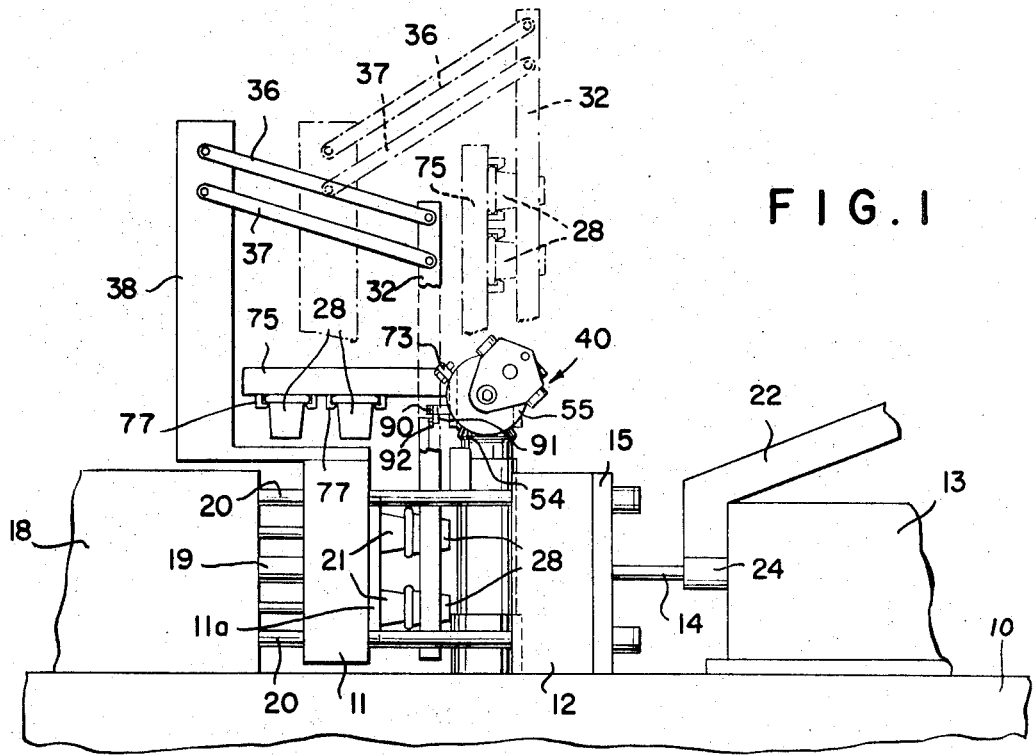
Figure 2:
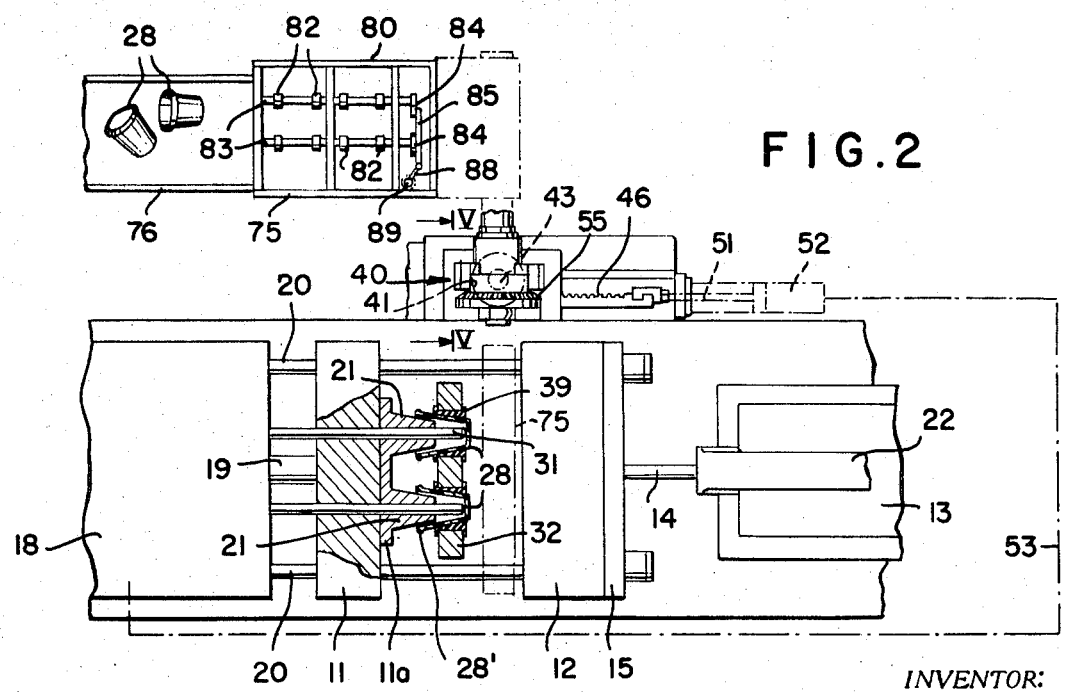
FIG. 2 is a top view (partly broken away) of the assembly of FIG. 1.

The machine shown in FIGS. 1 and 2 comprises a base 10 which contains the various motors and controls necessary for operating its principal parts, i.e. its movable mold portion 11, co-operating with a stationary mold portion 12, and its injection piston (not shown) within a cylinder housing 13 which communicates via a channel 14 with an injection chamber within a fixed backing plate 15; mold portion 12, attached to plate 15, has several cavities (here 4) connected with the injection chamber via a sprue gate in the usual manner not further illustrated. The housing 18 for the mold drive contains a ram 19 reciprocably lodged therein, this ram being rigid with mold portion 11. The latter rides on a set of tie rods 20 and has an extension 11a from which cores 21 project toward corresponding cavities of mold portion 12.

A cylinder 22 houses a feed screw (not shown) which masticates and liquifies plastic material, supplied in a granular form to a nonillustrated hopper, prior to delivering it to a precompression chamber 24 from which it is subsequently discharged via the main compression chamber and the aforementioned sprue gate into the several cavities by the reciprocating injection piston whose own drive, co-ordinated with that of ram 19, also controls the feed screw in cylinder 22.

The mold cores 21 and their mating cavities in stationary mold portion 12 are designed, by way of example, to produce generally cup-shaped workpieces 28 with peripheral flanges 28'. Several ejector rods 31, one for each cavity, traverse the movable mold portion or platen 11 and pass axially through the cores 21 to lift the workpieces 28 off these cores upon the opening of the mold. A take-off plate 32 with seats 33 (FIG. 3) designed to receive the articles 28, suspended from a standard 38 atop platen 11 by means of a parallelogrammatic linkage 36, 37, has been lowered at this stage into the space between the two relatively movable mold portions 11, 12 to receive the articles detached from the cores 21 by the ejector rods 31. The parallelogrammatic linkage 36, 37 is operated, in timed relationship with the mold drive, as more fully described in my above-identified prior patent to elevate the loaded take-off plate 32 above the path of platen 11 when the mold closes; this has been illustrated in dot-dash lines in FIG. 1.

As shown in FIG. 3, the seats 33 of plate 32 may be provided with resilient linings 39 of rubber or the like designed to engage the articles 28 with sufficient force to hold them in their positions. Linings 39 are representative of a wide variety of yieldable means, including weak springs, serving for the temporary retention of the articles extracted from the mold.

Figure 5:
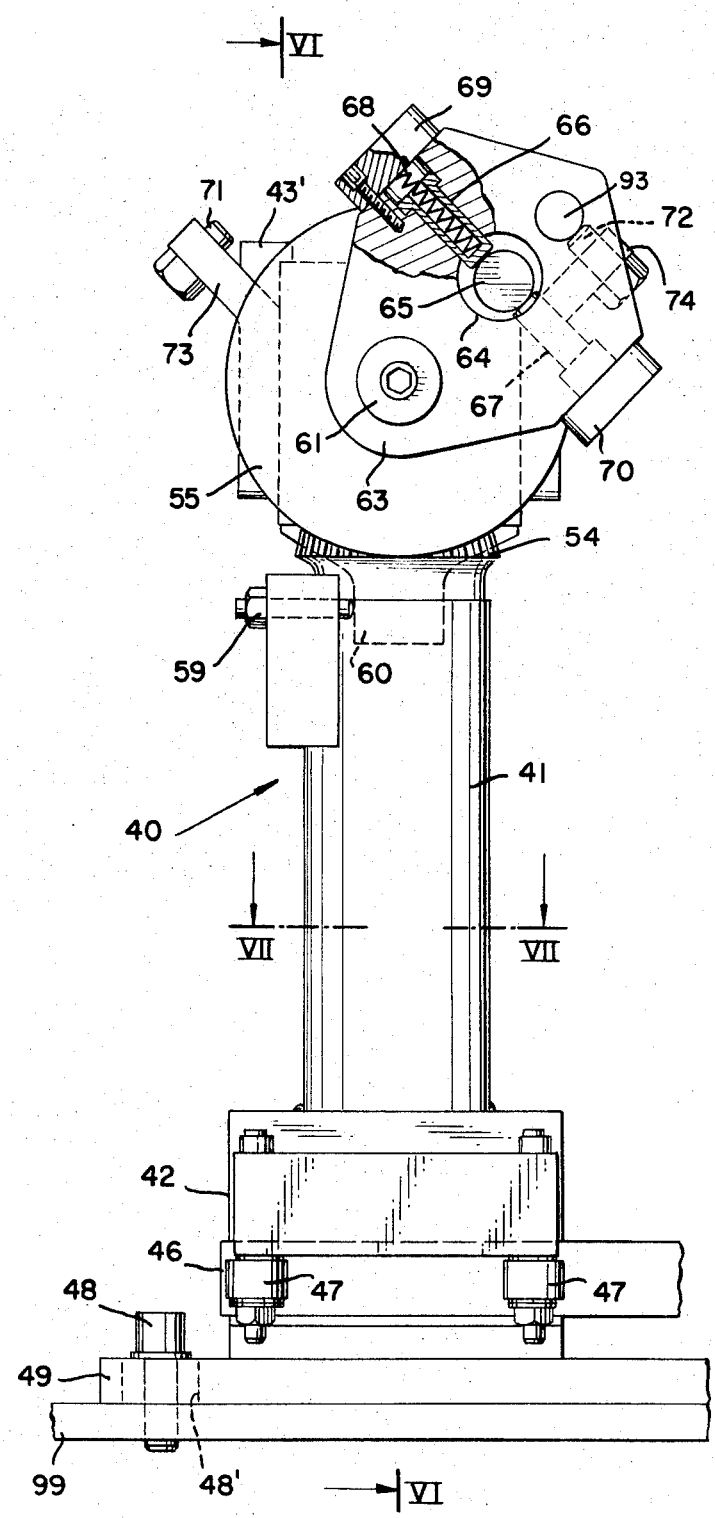
FIG. 5 is an elevation view of part of the transport mechanism of the system, taken on the line V—V of FIG. 2.
Figure 6:
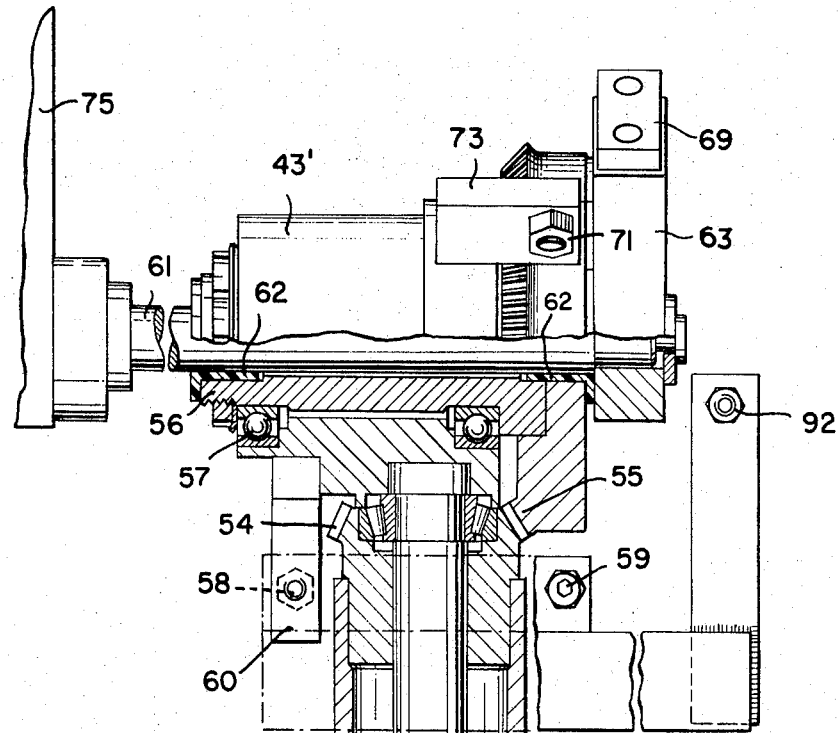
FIG. 6 is a longitudinal sectional view taken on the line VI—VI of FIG. 5.

A transporter 40, more fully illustrated in FIGS. 5 – 7, comprises a fixed upstanding tube 41 rising from a pedestal 42 in which a vertical shaft or column 43 is rotatably journaled by means of bearings 44. The lower end of column 43 is rigid with a pinion 45 engaged by a rack 46 which is held in contact with that pinion by rollers 47 on pedestal 42; this pedestal rises from a base plate 49 adjustably mounted on a foundation 99 by screws 48 traversing slots 48'. Rack 46 is reciprocated by a double-acting piston 51 in a hydraulic cylinder 52 to which fluid is admitted, in timed relationship with the mold drive and the injection piston, under the control of a synchronizing circuit illustrated diagrammatically at 53 in FIG. 2.

The top of tube 41 carries a relatively small gear 54 meshing with a larger gear 55 on a transverse shaft 56 journaled in the upper end 43' of column 43 by means of bearings 57. The tooth ratio of gears 54 and 55 is slightly greater than 1 : 2, e.g., 48 : 93, whereby gear 55 and shaft 56 rotate through an angle somewhat in excess of 90° whenever the column 43 executes a turn of 180°. The rotation of column 43 is limited to half a revolution by a pair of stop screws 58, 59 alternately engageable by a lug 60 depending from column 43'.

A stem 61 passes coaxially through the hollow shaft 56 and is supported therein, with freedom of limited relative rotation, by bearing sleeves 62 (e.g. of Teflon). An end of stem 61 projecting from shaft 56 is keyed to a crank 63 having an eccentric hole 64 which receives, with clearance, a stud 65 projecting from gear 55. Stud 65 is bracketed by a pair of thimbles 66, 67 which, as best seen for the thimble 66, are slidably lodged in transverse bores of the crank under pressure of springs 68 and are held in position by blocks 69, 70. Thimbles 66 and 67 constitute a pair of resiliently loaded plungers which bear upon stud 65 from opposite sides and, within the clearance afforded by the larger hole 64, allow for a limited relative angular displacement of crank 63 and gear 55, thus also of stem 61 and crank 56; the swing of this shaft is limited to an arc of exactly 90° by a stud 93 on the crank coacting with a pair of abutments 71, 72, in the form of adjustable screws, held in radially projecting lugs 73, 74 on the head 43' of column 43 in which the shaft 56 is cradled. Thus, a stroke of piston 51 results in a rotation of column 43 by half a turn, a rotation of shaft 56 through slightly more than 90°, and a swing of crank 63 by precisely a quarter-turn. This swing is communicated to a transfer plate 75, cantilevered on stem 61, which is thus constrained to assume a vertical attitude in a first position confronting the elevated take-off plate 32 (FIG. 3 and dot-dash lines in FIGS. 1 and 2) and a horizontal attitude (full lines, FIGS. 1 and 2) in a second position remote from the take-off plate. In the latter position, transfer plate 75 overlies a receiver 76 for the finished articles 28, e.g., a conveyor belt feeding these articles to a further destination. Elements 71, 72, 93 constitute a lost-motion coupling, for the purpose described above, and also serve as shock absorbers.

In the confronting position illustrated in FIG. 3, the workpieces 28 are engaged at their rims 28' by barbed extremities 77' of respective pairs of gripper lugs 77 which pass through cutouts 78 in plate 75 towards the side facing the plate 32 and which are pivoted at 79 to ribs 80 at the opposite side of plate 75. Springs 81 bear upon the rear ends 77'' of lugs 77, holding them in contact with a pair of cams 82 on a rod 83 rotatably journaled in some of these ribs. Each of the two rods 83 serving the four gripper assemblies of plate 75 terminates in a crank 84, the two cranks being articulated (as best seen in FIG. 4) to a link 85 which is urged by a spring 86 in a direction (to the right in FIG. 4) in which further movement is prevented by stop pins 87. Link 85 is hinged to a lever 88 on a shaft 89 carrying a disk 90 with an eccentric stud 91; a fixed stop 92, on an arm rigid with tube 41 also supporting the stops 58 and 59, engages the stud 91 whenever the plate 75 (having already reached its horizontal attitude) approaches its swung-out position illustrated in FIGS. 1 and 2. This engagement trips the release mechanism represented by linkage 84 – 91 so that cams 82 raise the ends 77'' of lugs 77 against the force of their biasing springs 81, thereby swinging the barbed extremities 77' of these lugs away from each other to disengage the workpiece 28 formerly gripped thereby. Since this occurs in a position in which the side of plate 75 carrying the workpieces faces downwardly, the articles 28 are free to drop onto the conveyor 76.

The rotatable column 43 and its stationary shell 41 may be constituted by telescoped members so as to be vertically extensible in case it is desired to raise or lower the transfer plate 75 during its swing away from or back to its pick-up position adjacent the take-off plate 32. Lugs 77 could be reversed to latch from within onto a hollow workpiece provided with inward projections. These and other modifications, readily apparent to persons skilled in the art, are intended to be embraced within the scope of my invention as defined in the appended claims.

I claim:

1. A transporter for articles to be removed from a support and deposited on a receiving surface, comprising:
   an upright column rotatable through a predetermined horizontal angle between a first and a second position;
   a transverse shaft extending generally horizontally from said column;
   a transfer member on said shaft swingable through a predetermined vertical angle between a first and a second attitude;
   a gear train including a stationary first gear coaxial with said column and a second gear rigid with said shaft;
   drive means for rotating said column back and forth between said first and second positions with concurrent rotation of said shaft by means of said gear throughout the column rotation to displace said transfer member between said first and second attitudes, said transfer member confronting said support on assuming said first attitude in said first position and overlying said receiving surface on assuming said second attitude in said second position, said gear train having a transmission ratio from said first to said second gear slightly exceeding the ratio of said vertical and horizontal angles whereby said shaft is driven through more than said vertical angle during each rotary stroke of said column;
   a two-way lost-motion coupling between said shaft and said transfer member for absorbing the excess shaft rotation;
   abutment means on said column for stopping said transfer member in said first and second attitudes against entrainment by said lost-motion coupling;
   retaining means on said transfer member effective in said first position to pick up an article from said support; and
   deactivating means for said retaining means effective in said second position to release such article onto said receiving surface.

2. A transporter as defined in claim 1 wherein said drive means comprises a pinion rigid with said column and a reciprocable rack in mesh with said pinion.

3. A transporter as defined in claim 1 wherein said gear train forms a step-down transmission between said column and said shaft.

4. A transporter as defined in claim 3 wherein said transmission has a step-down ratio of substantially 2 : 1, said horizontal angle being approximately 180°.

5. A transporter as defined in claim 1 wherein said lost-motion coupling comprises a stem on said transfer member coaxially journaled on said shaft, a crank rigid with said stem, an eccentric formation on said second gear, and cushioning means connecting said crank with said formation.

6. A transporter as defined in claim 5 wherein said cushioning means comprises a pair of spring-loaded jaws on said crank bracketing said formation.

7. A transporter as defined in claim 1 wherein said first gear is rigid with a tube surrounding said column.

8. A transporter as defined in claim 7 wherein said retaining means comprises at least one pair of relatively movable resiliently biased gripper elements, said deactivating means comprising a linkage on said transfer member engaging said gripper elements and stop means rigid with said tube engageable by said linkage in said second position for relatively displacing said gripper elements against their biasing force.

9. A transporter as defined in claim 8 wherein said linkage comprises movable cam means and spring-loaded lever means connected with said cam means.

10. A transporter as defined in claim 9 wherein said transfer member is a plate with at least one cutout, said gripper elements being lugs pivoted to said plate traversing said cutout and terminating in barbed extremities on one side of said plate, said cam means being disposed on the other side of said plate in engagement with opposite ends of said lugs.

11. A transporter for articles to be removed from a support and deposited on a receiving surface, comprising:
   an upright column rotatable through a predetermined horizontal angle between a first and second position;
   a transverse shaft extending generally horizontally from said column;
   a transfer plate on said shaft swingable through a predetermined vertical angle between a first and a second attitude;
   drive means for rotating said column back and forth between said first and second positions with substantially concurrent swinging of said transfer plate between said first and second attitudes, said transfer plate confronting said support on assuming said first attitude in said first position and overlying said receiving surface on assuming said second attitude in said second position;
   at least one pair of lugs pivoted to said transfer plate and traversing a cutout thereof while terminating in barbed extremities on one side of said plate;
   cam means on the other side of said plate in engagement with opposite ends of said lugs;
   spring-loaded lever means connected with said cam means, said extremities being operative to pick up an article from said support in said first position; and
   stationary stop means engageable with said lever means in said second position for operating said lugs to release such article onto said receiving surface.

* * * * *